(12) United States Patent
Ryuzaki et al.

(10) Patent No.: US 9,828,516 B2
(45) Date of Patent: Nov. 28, 2017

(54) PAINT COMPOSITION, METHOD OF FORMING A PAINT FILM USING SAME AND THE PAINT FILM

(75) Inventors: Haruko Ryuzaki, Yokohama (JP); Kaori Notoya, Sagamihara (JP); Shigeo Misawa, Yokohama (JP)

(73) Assignee: BASF Japan Ltd., Tokyo (JP)

( * ) Notice: Subject to any disclaimer, the term of this patent is extended or adjusted under 35 U.S.C. 154(b) by 545 days.

(21) Appl. No.: 13/255,776

(22) PCT Filed: Jan. 28, 2010

(86) PCT No.: PCT/IB2010/000181
§ 371 (c)(1),
(2), (4) Date: Sep. 9, 2011

(87) PCT Pub. No.: WO2010/103355
PCT Pub. Date: Sep. 16, 2010

(65) Prior Publication Data
US 2011/0318570 A1    Dec. 29, 2011

(30) Foreign Application Priority Data

Mar. 9, 2009  (JP) ................................ 2009-054754

(51) Int. Cl.
| | | |
|---|---|---|
| *B32B 5/16* | (2006.01) | |
| *C04B 14/20* | (2006.01) | |
| *C04B 14/04* | (2006.01) | |
| *B05D 1/36* | (2006.01) | |
| *C09D 11/50* | (2014.01) | |
| *C09D 5/36* | (2006.01) | |
| *C09D 7/12* | (2006.01) | |
| *C08K 3/22* | (2006.01) | |
| *C08K 3/34* | (2006.01) | |
| *C08K 9/02* | (2006.01) | |

(52) U.S. Cl.
CPC ............. *C09D 11/50* (2013.01); *C09D 5/36* (2013.01); *C09D 7/1225* (2013.01); *C08K 3/22* (2013.01); *C08K 3/34* (2013.01); *C08K 9/02* (2013.01); *Y10T 428/251* (2015.01); *Y10T 428/257* (2015.01)

(58) Field of Classification Search
USPC ........................................................ 428/324
See application file for complete search history.

(56) References Cited

U.S. PATENT DOCUMENTS

| | | | |
|---|---|---|---|
| 2007/0034112 A1 | 2/2007 | Mronga et al. | |
| 2009/0075100 A1* | 3/2009 | Kitamura | ...................... 428/457 |

FOREIGN PATENT DOCUMENTS

| | | |
|---|---|---|
| DE | 102005055576 A1 | 5/2007 |
| DE | 102006060997 A1 | 6/2008 |
| DE | 102008020442 A1 | 10/2009 |
| JP | 09-235492 A | 9/1997 |
| JP | 2000086943 A | 3/2000 |
| JP | 2001327915 A | 11/2001 |
| JP | 2002121494 A | 4/2002 |
| JP | 2003073620 A | 3/2003 |
| JP | 2005126467 A | 5/2005 |

OTHER PUBLICATIONS

International Search Report for International application No. PCT/IB2010/000181 dated May 10, 2010.
Raimund Schmid, et al.; "Luster pigemnts with optically variable properties"; European Coatings Journal, 7-8; pp. 702-705 (1997).
Written Opinion for International application No. PCT/IB2010/000181.

* cited by examiner

*Primary Examiner* — Cheng Huang
(74) *Attorney, Agent, or Firm* — Servilla Whitney LLC

(57) ABSTRACT

A paint composition producing paint films which change from an achromatic color to a chromatic color when the angle of incidence of the light with respect to the normal to the paint film plane is changed. The paint composition comprises (A) glitter material which has an angle-dependent interference effect and (B) metal oxide coated mica and/or metal oxide coated alumina flakes in proportions where the content ratio ((A)/(B)) of the (A) component with respect to the (B) component, as the solid fraction mass ratio, is from 2.5/1 to 1/6 and in which the interference color of the (A) component and the interference color of the (B) component at a face angle of the paint film have a complementary color relationship.

7 Claims, 2 Drawing Sheets ab Chromaticity Diagram

PAINT COMPOSITION, METHOD OF FORMING A PAINT FILM USING SAME AND THE PAINT FILM

CROSS REFERENCE TO RELATED APPLICATIONS

This application is a National Phase Application of Patent Application PCT/IB2010/000181 filed on 28 Jan. 2010, which claims priority to JP 2009-054754, filed 9 Mar. 2009, both of which are hereby incorporated by reference in their entirety.

FIELD OF THE INVENTION

The present invention concerns paint compositions with which it is possible to form paint films which, on changing the angle of incidence of the light with respect to the normal to the paint film plane, change dramatically from being a paint film of an achromatic color to being a paint film of a chromatic color.

BACKGROUND OF THE INVENTION

When paints which include a glitter-material which has an angle-dependent interference effect have been used in the past the change in the interference color of the mirror reflected light obtained by changing the viewing angle of the paint film which has been formed from a face angle to a grazing angle has been just a change from a chromatic color to a chromatic color of a different hue, and an effect of changing from an achromatic color at a facing angle to a chromatic color at a grazing angle has not been obtained.

For example, dichroic paint compositions which include (1) a vehicle, (2) a metal oxide coated silica flake pigment and, as required, (3) a glitter pigment and/or coloring pigment are known as dichroic paint compositions which can exhibit stable dichroism which provides colors which differ according to the viewing angle (see Patent Citation 1). However, when the viewing angle from which the paint film is seen after painting is shifted from right above at more or less 90° which is a face angle to about 15° which is a grazing angle the effect of changing from an achromatic color to a chromatic color is not obtained.

Furthermore, glitter paint compositions which are clear paint compositions which contain vehicle and two or more types of interference glitter pigment and one of the above-mentioned two or more types of interference glitter pigment is an interference glitter pigment (a) of average particle diameter from 5 to 10 μm and the other type is an interference glitter pigment (b) which has an average particle diameter from 10 to 30 μm and manifests a interference color different from that of the interference pigment (a), and in which the relationship (c) that {average particle diameter of interference glitter pigment (b)–average particle diameter of interference glitter pigment (a)=from 10 to 25 μm} exists are known as glitter paint compositions which can manifest a design of three colors depending on the angle from which the paint film is seen (see Patent Citation 2). However, although with a paint film which has been formed from this glitter paint composition the color differs according to the viewing angle, but the saturation in the highlight is higher than the saturation in the shade and an effect such that it becomes an achromatic color at a face angle and a chromatic color at a grazing angle is not obtained.

Furthermore, glitter paint compositions which include (a) a first glitter pigment where the whole surface of a thin leaf-like base material has been essentially coated with a layer in which a colored pigment has been dispersed in a matrix which has silicon oxide as the main component, (b) a second glitter pigment comprising a glitter pigment which is different from the first glitter pigment and (c) a vehicle and in which the total amount of the aforementioned first and second pigments included as the pigment mass content (PWC) is from 1 to 30% is known as a paint composition with which a paint film which has a sense of high saturation in the highlight parts and some depth of a sense of faded whiteness in the shade parts due to a synergistic effect of the colored glitter pigment with a high selective color region and the other glitter pigment can be obtained (see Patent Citation 3). However, the paint films formed from this glitter paint composition have a high saturation in the highlights and a low saturation in the shade but they do not provide an effect such that they have an achromatic color at the face angle and chromatic color at a grazing angle. Furthermore the color of the paint film at a grazing angle is an achromatic color which is deep black and the color when seen at a face angle is a chromatic color and this is different from the novel design which is the intention of the inventors of the present application.

Furthermore, a method of forming a laminated pearl paint film which includes a process in which a mica base paint film is formed on a base material on which an undercoat paint film and a mid-coat paint film have been formed; a process in which a clear paint film is formed over the top without curing the mica base paint film; and a process in which the mica base paint film and the clear paint film are cured by heating which is characterized in that the mica base paint from which said mica base paint film is formed contains titanium oxide coated silica flakes with a pigment weight concentration (PWC) in the range from 1 to 18%, and the brightness of said laminated pearl paint film as the L value is from 0 to 30 is known as a method for obtaining laminated pearl paint film in which the phenomenon of the low-color parts becoming white (becoming an achromatic color) when seen from a shade position which occurs in an interference mica pigment containing paint film is suppressed using the titanium dioxide coated silica flakes and which has an excellent sense of transparency (see Patent Citation 4). However, these laminated pearl paint films have a high saturation in the highlights and a low saturation in the shade, and they do not provide an effect such that they become an achromatic color at a face angle and a chromatic color at a grazing angle. Furthermore, the color of the paint film at a grazing angle is an achromatic color which is a deep black and the color when seen from the face angle is a chromatic color and they are different from the novel design which is the intention of the inventors of the present invention.

Furthermore, a glitter paint composition containing vehicle, interference glitter pigment and composite oxide fired pigment in which, when the hue of the interference color of the aforementioned interference glitter pigment is set to the hue 0 in the Munsell representation system and, for a Munsell hue ring pf 100, counterclockwise rotation is +50 and clockwise rotation is −50, the hue H of the interference color of the composite oxide fired pigment is within the hue range from +30 to +50, or from −30 to −50, is known as a glitter paint composition with which it is possible to form paint films with which a sense of high saturation is obtained in the shade parts, the color difference between the highlight parts and shade parts is enhanced, it is possible to realize polychromatic designs, and with which a more sophisticated sense of glitter can be obtained (see Patent Citation 5).

However, by adding a colored pigment to the interference glitter pigment the paint films which are formed are such that the color at a face angle is greatly affected by the hue of the colored pigment which has a higher coloring power than the glitter pigment, and the effect of being an achromatic color at a face angle and a chromatic color at a grazing angle is not obtained.

Furthermore, a paint composition which contains per 100 parts by weight of film-forming binder (A), from 0.1 to 15 parts by weight of (B) metallic powder, from 0.1 to 10 parts by weight of (C) a first colored pigment of primary particle size from 0.01 to 0.2 μm selected from among the phthalocyanine, perylene, indanthrone, azmethine, benzimidazolone, quinacridone, anthraquinone, diketopyrrolopyrrole and dioxazine pigments and from 0.5 to 50 parts by weight of (D) a second colored pigment of primary particle size from 0.1 to 2 μm selected from among the diketopyrrolopyrrole, quinacridone, pyrazolone, naphthol AS, iron oxide and composite metal oxide pigments, and in which the primary particles of pigment (C) are relatively smaller than those of pigment (D) and the pigment (C) and the pigment (D) have the relationship of complementary colors is known as a design metallic paint in which the complementary color relationship of the pigments is utilized (see Patent Citation 6). However, the effect of being an achromatic color at a face angle and a chromatic color at a grazing angle is not obtained with the paint films formed from this paint composition.

PRIOR ART LITERATURE

Patent Literature

Patent Citation 1:
Japanese Unexamined Patent Application Laid Open 2000-086943
Patent Citation 2:
Japanese Unexamined Patent Application Laid Open 2003-073620
Patent Citation 3:
Japanese Unexamined Patent Application Laid Open 2005-126467
Patent Citation 4:
Japanese Unexamined Patent Application Laid Open 2001-327915
Patent Citation 5:
Japanese Unexamined Patent Application Laid Open 2002-121494
Patent Citation 6:
Japanese Unexamined Patent Application Laid Open H9-235492

Non-Patent Literature

Non-Patent Citation 1:
Raimund Schmid et al., European Coatings Journal, (7-8) p. 702-705 (1997)

SUMMARY OF THE INVENTION

Paint compositions with which paint films which have an angular dependence due to the synergistic effect of a combination of glitter pigments and a high saturation are known, but the color changes continuously on changing the viewing angle of the paint film from a face angle to a grazing angle and paint compositions with which it is possible to form paint films such that they are an achromatic color at a face angle and a chromatic color at the grazing angle have not been obtained.

As a result of thorough research carried out with a view to resolving the abovementioned problem the inventors have discovered that the problem can be resolved by including in specified proportions a glitter material (A) which has a viewing angle dependent interference effect and (B) metal oxide coated mica and/or metal oxide coated alumina flakes and setting the interference color of the (A) component and the interference color of the (B) component at a face angle of the paint film in a complementary color relationship, and the invention is based upon this discovery.

That is to say, the present invention provides a paint composition which includes (A) glitter material which has an angle-dependent interference effect and (B) metal oxide coated mica and/or metal oxide coated alumina flakes in proportions where the content ratio ((A)/(B)) of the (A) component with respect to the (B) component, as the solid fraction mass ratio, is from 2.5/1 to 1/6 and in which the interference color of the (A) component and the interference color of the (B) component at a face angle of the paint film have a complementary color relationship, and with which on changing the viewing angle of a paint film obtained by painting with said paint composition from a face angle to a grazing angle the color of said paint film changes from an achromtic color to a chromatic color (here a face angle indicates a viewing angle where the light source angle of incidence is within the range from 0° to about 25° and the received-light angle approximates to a mirror reflection of the angle of incidence (mirror reflection angle ±10°), and a grazing angle indicates a viewing angle where the light source angle of incidence is within the range from 65° to about 90° and the received-light angle approximates to a mirror reflection of the angle of incidence). Furthermore, the invention provides a paint composition wherein the glitter material (A) which has an angle-dependent interference effect in the abovementioned paint composition is metal oxide coated silica flakes and/or interference aluminum.

Furthermore, the invention provides a paint composition where the aforementioned paint composition also includes (C) a black colored pigment.

Furthermore, the invention provides a method of paint-film formation by painting a paint composition which includes (A) glitter material which has an angle-dependent interference effect and (B) metal oxide coated mica and/or metal oxide coated alumina flakes in proportions where the content ratio ((A)/(B)) of the (A) component with respect to the (B) component, as the solid fraction mass ratio, is from 2.5/1 to 1/6 and with which, by setting the interference color of the (A) component and the interference color of the (B) component, in a face angle of the paint film, to a complementary color relationship, there is formed a paint film with which on changing the viewing angle of the paint film obtained by painting said paint composition from a face angle to a grazing angle the color of said paint film changes from an achromatic color to chromatic color (here a face angle indicates a viewing angle where the light source angle of incidence is within the range from 0° to about 25° and the received-light angle approximates to a mirror reflection of the angle of incidence (mirror reflection angle ±10°), and a grazing angle indicates a viewing angle where the light source angle of incidence is within the range from 65° to about 90° and the received-light angle approximates to a mirror reflection of the angle of incidence).

Furthermore, the invention provides a method of paint-film formation in which a base coat paint film is formed by applying the abovementioned paint composition as a base coat paint and a clear paint film is formed by applying a clear paint over said base coat paint film.

Furthermore, the invention provides a method of paint-film formation in which a first base coat paint film is formed by applying a first base coat paint, a second base coat paint film is formed by applying the abovementioned paint composition as a second base coat paint over said first base coat paint film, and a clear coat paint film is formed by applying a clear paint over said second base coat paint film.

Furthermore, the invention provides a paint film which has been obtained using the abovementioned methods of paint-film formation.

The paint compositions of this invention enable paint films which have an excellent design feature such that the hue changes continuously on changing the viewing angle from a face angle to a grazing angle and becomes an achromatic color at a face angle and a chromatic color at a grazing angle to be formed.

DETAILED DESCRIPTION OF AN EMBODIMENT OF THE INVENTION

First of all the definitions of the terms used in the invention will be described.

A "mirror reflection angle" is the angle when the incident light is mirror-reflected at a symmetrical angle with respect to the normal to the paint film being measured.

A "complementary color relationship" signifies colors which are related by being opposite to one another on the hue ring of the Munsell color system.

Figure 3:
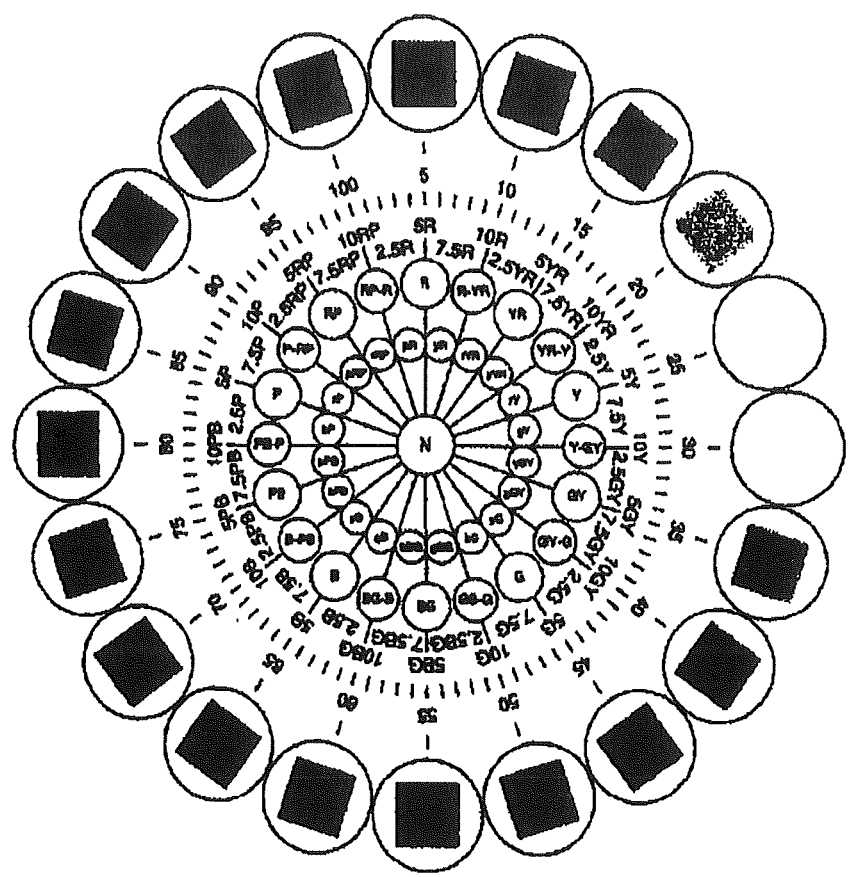
FIG. 3 shows a hue ring of the Munsell color system.

In more practical terms, a complementary color relationship is that when, on a color hue ring of 100, the interference color of the (A) component is set to the hue 0 in the Munsell color system, counterclockwise rotation with respect to this hue is indicated as +50 and clockwise rotation is indicated as −50, the interference color of the (B) component is within the hue range from +30 to +50 or from −30 to −50. A hue ring of the Munsell color system is shown in FIG. 3.

Furthermore, the individual hues of the glitter material which has an angle-dependent interference effect, and the metal oxide coated mica and the metal oxide coated alumina flakes which are used in this invention, are set by choosing the closest color element by comparison with the Standard Color Chart (according to JIS 28721, Japanese Industrial Standards Association, published 1981) as the hue (Munsell list).

Figure 1:
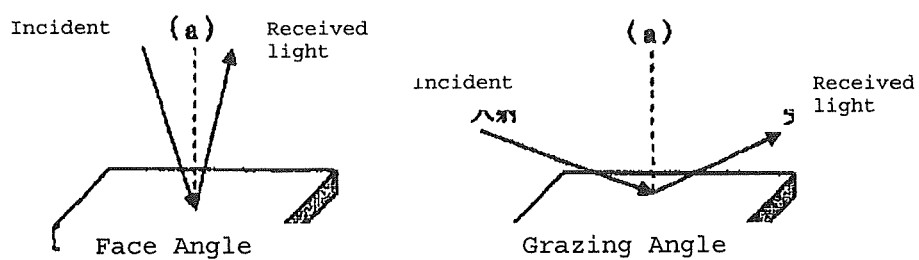
FIG. 1 is an explanatory drawing which shows the face angle and the grazing angle.

A "face angle" signifies a viewing angle where the angle of incidence is within the range from 0° to about 25° and the light receiving agent is close to a mirror reflection of the angle of incidence (the range of mirror reflection ±10°) and a "grazing angle" signifies a viewing angle where the angle of incidence is from about 65° to 90° and the light receiving angle is close to a mirror reflection of the angle of incidence (the range of mirror reflection ±10°). In order to facilitate understanding this is illustrated in FIG. 1. In the diagram (a) is the normal to the paint film plane.

Furthermore, there is an explanation of "face angle" and "grazing angle" by Raimund Schmid et al. in European Coating Journal, July/August 1997, pages 702 to 705 (Non-patent Citation 1).

The "saturation of an interference color is the value of the saturation measured at a light receiving angle approaching mirror reflection of the angle of incidence with a variable angle spectrophotometer.

Having a "angle-dependant interference effect" signifies that the hue differs at the light receiving angles approaching mirror reflection corresponding to a plurality of angles of incidence with respect to the paint film.

For example, in the case of metal oxide coated mica there is an interference effect but there is no change in hue with the angle, and red mica is red at all angles and green mica is green at all angles and so these cannot be said to be glitter materials which have an angle-dependent interference effect.

A "change in saturation from an achromatic color to a chromatic color" signifies that on measuring the color of a paint film with an angle dependent spectrophotometer, the mirror reflection angle is highly saturated when the angle of incidence is from 65 to 75 (when indicated by the C value, a larger numerical indicating a higher saturation), while when the angle of incidence is 0° the mirror reflection angle has low saturation (C value not more than 10).

Moreover, the variable angle spectrophotometer used in this invention is the Variable Angle Spectrophorometer model GSP-2 (variable angle spectrophotometer system GCMS-4) produced by the Murakami Shikisai Gijutsu Kenkyujo K.K.

Furthermore, a "continuous change in hue" signifies that when five (a,b) values on the ab chromaticity diagram measured under conditions of angle of incidence and angle of reflection with respect to the normal to the paint film plane from 0° and −10° (minus ten degrees), 25° and 15°, 45° and 35°, 65° and 55°, and 75° and 65° are plotted on the ab coordinate axes the five measured values on the coordinates change continuously so as to describe an arc.

The invention is described in detail below.

The glitter material which has an angle-dependent interference effect of (A) component which is used in a paint composition of this invention is a material of which the hue differs at each light receiving angle approaching the mirror reflection angle of a plurality of incident light angles when it has been formed into a paint film. In more practical terms these include metal oxide coated silica flakes and interference aluminum and the like, and these can be used individually or conjointly.

The metal oxide coated silica flakes include those disclosed, for example, in Japanese Unexamined Patent Application Laid Open 2000-086943 (Patent Citation 1), and actual examples include silicon dioxide flakes which have been coated with iron oxide (iron mono-oxide, di-iron tri-oxide) or titanium dioxide.

Examples of the commercially available iron oxide coated silica flakes and titanium oxide coated silica flakes include those with the trade names of the Colorstream series produced by the Merck Co.

Furthermore, the materials which have an aluminum flake base material which has been surface treated with a silica layer, metal atom layer, protective layer and the like can be cited as examples of interference aluminum, and examples of commercial products include those with the product name Chromashine produced by the Toyo Aluminum Co.

The materials used as glitter materials in glitter paints, for example, can be cited as examples of the metal oxide coated mica and metal oxide coated alumina flakes which form the (B) component in this invention.

Those where a metal oxide coating has been formed on the surface of thin flake-like mica particles can be cited as metal oxide coated micas, and the interference mica pigments such where a thin film of titanium dioxide, iron oxide or other metal oxide such as chromium, cobalt, tin, zirconium or the like has been coated on the surface a natural white mica or synthetic mica can be cited as examples.

Those metal oxide coated alumina flakes where thin flake-like alumina ($Al_2O_3$), and preferably thin flake-like alumina which contains titanium oxide, has been coated with a metal oxide such as titanium dioxide, iron oxide and the like which has a large refractive index can be cited as metal oxide coated alumina flakes, and examples of commercial products include those with the trade name Xirallic produced by the Merck Co.

The present invention is distinguished by the fact that on changing the viewing angle from a face angle to a grazing angle the hue changes continuously with an achromatic color at a face angle and a chromatic color at a grazing angle, and it is an essential requirement that the interference color at a face angle of the (A) component and the interference color at a face angle of the (B) component have a complementary color relationship.

In terms of the change in saturation, the numerical value of the saturation measured with a variable angle spectrophotometer at an angle of incidence of 75° compared with the numerical value at 0° is preferably at least 10, and most desirably at least 15.

As mentioned above, the mirror reflection angle is the angle on reflection at an angle which is symmetrical with the incident light with respect to the normal of the measured film plane, and the complementary color relationship has hues which are opposite one another on the hue ring of the Munsell color system. In more practical terms when, in a situation in which, on a hue ring of 100, the interference color of the (A) component is the hue 0 in the Munsell color system and with respect to this hue counterclockwise rotation is indicated by +50 and clockwise rotation is represented by −50, the interference color of the (B) component is within the range from +30 to +50, or within the range from −30 to −50, then this is called a complementary color relationship.

When, more desirably, the interference color of the (B) component is within the range from +35 to +50 or within the range from −35 to −50 and, most desirably within the range from +40 to +50 or from −40 to −50, the dramatic change in hue from an achromatic color to a chromatic color is even more remarkable.

In those cases where the interference color of the (B) component with respect to the hue of the (A) component is not within the hue range from +30 to +50 or −30 to −50, the change in saturation from an achromatic color to chromatic color is not seen.

The content ratio ((A)/(B)) of the (A) component with respect to the (B) component in a paint composition of this invention as the solid fraction mass ratio is from 2.5/1 to 1/6, preferably from 2/1 to 1/5, and most desirably from 1.5/1 to 1/4.5.

In those cases where the content ratio of the (A) component with respect to the (B) component is more than 2.5 times and in those cases where it is less than 1/6 of the (B) component the effect of the hue changing continuously on changing the viewing angle from a face angle to a grazing angle and of being an achromatic color at a face angle and a chromatic color at a grazing angle is not seen.

Furthermore, the total amount of the (A) component and the (B) component included is preferably from 0.5 to 40 mass %, more desirably from 1.0 to 30 mass %, and most desirably from 2.0 to 25 mass % of the whole of the solid fraction of the paint.

In those cases where the total amount of the (A) component and the (B) component included is less than 0.5 mass % of the whole of the solid fraction of the paint the effect of the hue changing continuously on changing the viewing angle from a face angle to a grazing angle and of being an achromatic color at a face angle and a chromatic color at a grazing angle declines. If the amount exceeds 40 mass % then the appearance of the paint film declines.

A black colored pigment can be included as a further component (C) in a paint composition of this invention. A strengthening of the interference effect of the (A) component and the (B) component is achieved by including a black pigment.

Inorganic pigments such as carbon black, black iron oxide and the like, or organic pigments can be used for the black pigment, but carbon black is especially desirable.

Furthermore, the amount of the (C) component used in this invention is preferably from 0.1 to 200 mass %, more desirably from 0.5 to 150 mass %, and most desirably from 1.0 to 130 mass % with respect to the total amount of the (A) component and (B) component included.

If the (C) component content is less than 0.1% with respect to the total amount of (A) component and (B) component included then the concealing performance of the paint declines, and in those cases where it exceeds 200 mass % the interference effect of the (A) component and the (B) component is weak and the saturation of the interference color at all angles is inevitably reduced.

The resins which are generally used as paint-film forming resins for use in paints can be used without limitation for the paint-film forming resin which is used in a paint composition of this invention. Actual examples include acrylic resins, polyester resins, alkyd resins, polyolefin resins, chlorinated polyolefin resins, fluorinated resins, silicon resins and the like, either individually or in combinations of two or more types.

A paint composition of this invention can be an uncrosslinked lacquer-type paint composition which includes one type, or two or more types, of the aforementioned paint-film forming resin, or it can be a crosslink hardening type paint composition in which one type, or two or more types, of the aforementioned paint-film forming resins is/are combined with a crosslink-forming resin comprising, for example, one type, or a combination of two or more types, of amino resin, (blocked) polyisocyanate compound, epoxy compound or the like.

Other colored pigments and various additives and the like can be compounded in a paint composition of this invention. Those colored pigments generally used in paints in the past can be used as colored pigments, and, for example, the azo lake pigments, phthalocyanine pigments, indigo pigments, perinone pigments, perylene pigments, quinophthalone pigments, dioxazine pigments, quinacridone pigments and the like can be cited as organic pigments and yellow iron oxide, red iron oxide, titanium dioxide and the like can be cited as inorganic pigments.

Furthermore, ultraviolet absorbers such as those based on benzotriazole, oxalic acid anilide and the like, antioxidants such as those based on the benzophenones and the like, leveling agents such as those based on silicone and the like, viscosity controlling agents such as waxes, organic bentonite and the like, curing catalysts and the like can be cited as additives.

The paint compositions of this invention can be dissolved and used in an organic solvent. Aromatic hydrocarbon solvents, ester-based solvents, ketone-based solvents, alcohol-based solvents, ether-based solvents and the like can be used as organic solvents.

The paint compositions of this invention can be applied using in usual methods of painting, for example the spray painting methods such as air spraying, electrostatic air spraying, airless spraying and the like, the painting methods in which the painting machines which are generally used, such as a roll coater, a flow-coater and a dipping type painting machine are used, and painting methods in which brushes, bar coaters, applicators and the like are used. From among these the spray painting methods are preferred.

Metals including iron, aluminum, magnesium and alloys of these metals, moldings of inorganic materials such as glass, concrete and the like, moldings of resins such as polyethylene, polypropylene, ethylene/vinyl acetate copolymers, polyamide, polyacrylic, polyester, vinyl chloride resins, vinylidene chloride resins, polycarbonate, polyurethane, acrylonitrile/butadiene/styrene copolymers and the like, moldings of plastic materials such as the various types of FRP, wood, paper and the like can be cited as base materials on which the paint compositions of this invention can be painted. Moreover, electro-deposition paints and mid-coat paints may be optionally pre-coated onto these base materials.

The paint compositions of this invention are suitable for use as base-coats in automobile and industrial applications. For this purpose paint-film forming methods with a two-coat one-bake or two-coat two-bake method of painting in which a paint composition of this invention is applied to the base material and then a clear paint is applied, and paint-film forming methods with a three-coat one-bake, three-coat two-bake or three-coat three-bake coating method in which a first base coat paint is applied as an undercoat for the paint of this invention, and then a paint composition of this invention is applied as a second base coat and then a clear paint is applied can be used.

In particular, the brightness of a triple-layer paint film can be controlled by using a base coat of a white color or a light hue or by using a base coat of a dark hue for the first base coat and it is possible to achieve a wide variation in design.

Brightness in this invention means the L value with a color difference meter CR-400 (produced by Konika-Minolta Co.) is preferably from 20 to 80, and most desirably from 35 to 70.

The known clear coats can be used for the clear coat in the film-forming methods in which a paint composition of this invention is used.

Furthermore, a colored base coat, or those generally known as color base coats, can generally be used for the first base coat in the film-forming methods in which a paint composition of this invention is used, and examples include those disclosed in Japanese Unexamined Patent Application Laid Open 2007-216220.

When a first base coat is used in a paint-film forming method in which a paint composition of this invention is used the dry film thickness of this layer is preferably from 2 to 40 µm, and most desirably from 5 to 30 µm. Furthermore, the dry paint film thickness of the paint composition of this invention is preferably from 1 to 30 µm, more desirably from 3 to 25 µm, and most desirably from 5 to 20 µm. Moreover, the dry paint film thickness of the clear paint is preferably from 10 to 70 µm and more desirably from 20 to 50 µm.

If the dry paint film thickness of the paint composition of this invention is less than 1 µm then there is a risk that the underlying base will not be concealed, and if it exceeds 30 µm then problems with runs and the like arise at the time of painting and this is undesirable.

In the method of paint-film formation of this invention a clear coat paint is painted on the base coat paint film and a clear coat paint film layer is formed and the clear coat paint film layer is baked and hardened, and the baking temperature of the clear coat paint film layer should generally be selected appropriately from within the range from 120 to 180° C. and the baking time should be selected appropriately from with the range from 10 to 60 minutes.

In the case of a triple coat comprising a first base coat, a second base coat of this invention and a clear coat, a three-coat one-bake system where the painting is carried out wet-on-wet without baking each base coat and just baking once after applying the clear paint is preferred from the viewpoint of energy conservation.

ILLUSTRATIVE EXAMPLES

The invention is described in more practical terms below by means of illustrative examples. Moreover, the invention is not limited by these illustrative examples.

Example of Production 1

Production of the Base Coat Paint Composition B-1

(A) 5 parts by mass of titanium dioxide coated silica flakes (Colorstream T20-04WNT, produced by the Merck Co., hue at a face angle: yellow-green system color) as a glitter material which had an angle dependent interference effect and (B) 5 parts by mass of metal oxide coated mica (trade name Iriodin 223WNT, produced by the Merck Co., hue at a face angle: violet system color, having a complimentary color relationship at a face angle with the Colorstream T20-04WNT) were mixed in a beaker with 10 parts by mass of an organic solvent mixture (toluene/xylene/butyl acetate/butanol in proportions by weight of 30/40/20/10) and wetted and then, in a separate container, 120 parts by mass of an acrylic resin varnish (trade name LH-7800, produced by the BASF Coatings Japan Co., residue on heating 50 mass %, hydroxyl group value 46 mgKOH/g, acid value 7 mgKOH/g, number average molecular weight 20,000), 50 parts by mass of butylated melamine resin varnish (trade name Yuban 20SE, produced by the Mitsui Kagaku Co.), residue on heating 60 mass %) and 30 parts by mass of the abovementioned mixed solvent were mixed together and stirred, and the wetted mixture of (A) and (B) was added slowly, with stirring, to this mixed varnish solution and thoroughly stirred until uniform and the base paint composition B-1 was obtained.

Preparation of the Base Coat Paint Composition B-2

Acrylic resin varnish LB-7800 (15 parts by mass), 1.5 parts by mass of carbon black (trade name Pigment Black FW200, produced by the Degussa Co.) and 13.5 parts by mass of xylene were dispersed in a dispersion container in a sand mill until the particle size was less than 10 µm to prepare a carbon black paint composition.

(A) 5 parts by mass of titanium dioxide coated silica flakes (Colorstream T20-04WNT, produced by the Merck Co., hue at a face angle: yellow-green system color) as a glitter material which had an angle dependent interference effect and (B) 5 parts by mass of metal oxide coated mica (trade name Iriodin 223WNT, produced by the Merck Co., hue at a face angle: violet system color, having a complimentary color relationship at a face angle with the Colorstream T20-04WNT) were mixed in a beaker with 10 parts by mass of an organic solvent mixture (toluene/xylene/butyl acetate/butanol in proportions by weight of 30/40/20/10) and wetted and then, in a separate container, 120 parts by mass of acrylic resin varnish LH-7800, 50 parts by mass of butylated melamine resin varnish Yuban 20SE and 30 parts by mass of the abovementioned mixed solvent were mixed together and stirred, and the wetted mixture of (A) and (B) was added slowly, with stirring, to this mixed varnish solution and thoroughly stirred. Then the whole of the abovementioned carbon black paint composition was added and stirring was carried out thoroughly until the system became uniform and the base paint composition B-2 was obtained.

Examples of Production 3 to 15

Preparation of the Base Coat Paint Compositions B-3 to B-15

The base coat paint compositions B-3 to B-15 were obtained in the same way as in Example of Production 2 but using the raw materials shown in Table 1 and Table 2.

Example of Production 16

Preparation of the Base Coat Composition B-16

Acrylic resin varnish LB-7800 (15 parts by mass), 1.5 parts by mass of a violet organic pigment (trade name Hostaparm Violet BL, produced by the Clarient Co.) and 13.5 parts by mass of xylene were dispersed in a dispersion container in a sand mill until the particle size was less than 10 μm to prepare a colored pigment paint composition.

(A) 5 parts by mass of titanium dioxide coated silica flakes (Colorstream T20-04WNT, produced by the Merck Co., hue at a face angle: yellow-green system color) as a glitter material which had an angle dependent interference effect was wetted in a beaker with 10 parts by mass of an organic solvent mixture (toluene/xylene/butyl acetate/butanol in proportions by weight of 30/40/20/10) and then, in a separate container, 120 parts by mass of acrylic resin varnish LH-7800, 50 parts by mass of butylated melamine resin varnish Yuban 20SE and 30 parts by mass of the abovementioned mixed solvent were mixed together and stirred, and the wetted (A) was added slowly, with stirring, to this mixed varnish solution and thoroughly stirred.

Then the whole of the abovementioned colored pigment paint composition and the whole amount of a carbon black paint composition which had been produced with the same method as in Example of Production 2 was added and stirring was carried out thoroughly until the system became uniform and the base paint composition B-16 was obtained.

TABLE 1

| | Example of Production | | | | | | | |
|---|---|---|---|---|---|---|---|---|
| | B-1 | B-2 | B-3 | B-4 | B-5 | B-6 | B-7 | B-8 |
| (1) Wetting of the Glitter Pigment | | | | | | | | |
| (A1) Colorstream T40-04WNT | 5.0 | 5.0 | | | 0.8 | 15.0 | 5.0 | 0.4 |
| (A2) Colorstream T20-03WNT | | | 2.0 | | | | | |
| (A3) Colorstream T20-01WNT | | | | 5.0 | | | | |
| (A4) Chromashine CR20R | | | | | | | | |
| (B1) Iriodin 223WNT | 5.0 | 5.0 | 8.0 | | 0.8 | 15.0 | | 0.4 |
| (B2) Iriodin Ultra 7235WNT | | | | 5.0 | | | | |
| (B3) Xirallic T60-22WNT | | | | | | | 5.0 | |
| (B4) Iriodin 231WNT | | | | | | | | |
| (D1) Alpaste TCR 2060 | | | | | | | | |
| Mixed Organic Solvent | 10 | 10 | 10 | 10 | 10 | 10 | 10 | 10 |
| (2) Mixing of the Base Resin | | | | | | | | |
| Acrylic Resin Varnish LB7800 | 120 | 120 | 120 | 120 | 120 | 120 | 120 | 120 |
| Melamine Resin Varnish Yuban 20SE | 50 | 50 | 50 | 50 | 50 | 50 | 50 | 50 |
| Mixed Organic Solvent | 30 | 30 | 30 | 30 | 30 | 30 | 30 | 30 |
| (3) Dispersion of Carbon Black | | | | | | | | |
| (C1) Carbon Black FW200 | | 1.5 | 1.2 | 1.5 | 2 | 0.2 | 1.5 | 1.0 |
| Acrylic Resin Varnish LB7800 | | 15.0 | 15.0 | 15.0 | 15.0 | 15.0 | 15.0 | 15.0 |
| Xylene | | 13.5 | 13.5 | 13.5 | 13.5 | 13.5 | 13.5 | 13.5 |
| (4) Dispersion of Colored Organic Pigment | | | | | | | | |
| (D2) Hostaparm Violet BL | | | | | | | | |
| Acrylic Resin Varnish LB7800 | | | | | | | | |
| Xylene | | | | | | | | |
| TOTAL | 220.0 | 250.0 | 249.7 | 250.0 | 242.1 | 268.7 | 250.0 | 240.3 |

TABLE 1-continued

|  | Example of Production | | | | | | | |
|---|---|---|---|---|---|---|---|---|
|  | B-1 | B-2 | B-3 | B-4 | B-5 | B-6 | B-7 | B-8 |
| Resin Solid Fraction in Paint (parts by mass) | 90.0 | 97.7 | 97.5 | 97.5 | 97.5 | 97.5 | 97.5 | 97.5 |
| Pigment Fraction in Paint (parts by mass) | 10.0 | 11.5 | 11.2 | 11.5 | 3.6 | 30.2 | 11.5 | 1.8 |
| Total Solid Fraction in Paint (parts by mass) | 100.0 | 109.0 | 108.7 | 109.0 | 101.1 | 127.7 | 109.0 | 99.3 |
| Complementary Color Relationship of (A) and (B) | Yes | Yes | Yes | Yes | Yes | Yes | Yes | Yes |
| Total (A) + (B) (parts by mass) | 10.0 | 10.0 | 10.0 | 10.0 | 1.6 | 30.0 | 10.0 | 0.8 |
| Total (A) + (B) (mass %) | 10.0 | 9.2 | 9.2 | 9.2 | 1.6 | 23.5 | 9.2 | 0.8 |
| Ratio (A)/(B) | 1/1 | 1/1 | 1/4 | 1/1 | 1/1 | 1/1 | 1/1 | 1/1 |
| Ratio (C)/{(A) + (B)} (mass %) | — | 15.0 | 12.0 | 15.0 | 125.0 | 0.7 | 15.0 | 125.0 |

TABLE 2

|  | Example of Production | | | | | | | |
|---|---|---|---|---|---|---|---|---|
|  | B-9 | B-10 | B-11 | B-12 | B-13 | B-14 | B-15 | B-16 |
| (1) Wetting of the Glitter Pigment | | | | | | | | |
| (A1) Colorstream T40-04WNT | 17.0 |  | 5.0 | 5.0 | 6.0 | 1.0 | 5.0 | 5.0 |
| (A2) Colorstream T20-03WNT |  |  |  |  |  |  |  |  |
| (A3) Colorstream T20-01WNT |  |  |  |  |  |  |  |  |
| (A4) Chromashine CR20R |  | 5.0 |  |  |  |  |  |  |
| (B1) Iriodin 223WNT | 17.0 | 5.0 |  |  | 2.0 | 7.0 |  |  |
| (B2) Iriodin Ultra 7235WNT |  |  |  |  |  |  |  |  |
| (B3) Xirallic T60-22WNT |  |  |  |  |  |  |  |  |
| (B4) Iriodin 231WNT |  |  |  | 5.0 |  |  |  |  |
| (D1) Alpaste TCR 2060 |  |  |  |  |  |  | 5.0 |  |
| Mixed Organic Solvent | 10 | 10 | 10 | 10 | 10 | 10 | 10 | 10 |
| (2) Mixing of the Base Resin | | | | | | | | |
| Acrylic Resin Varnish LB7800 | 120 | 120 | 120 | 120 | 120 | 120 | 120 | 120 |
| Melamine Resin Varnish Yuban 20SE | 50 | 50 | 50 | 50 | 50 | 50 | 50 | 50 |
| Mixed Organic Solvent | 30 | 30 | 30 | 30 | 30 | 30 | 30 | 30 |
| (3) Dispersion of Carbon Black | | | | | | | | |
| (C1) Carbon Black FW200 | 0.3 | 1.5 | 1.5 | 1.5 | 1.5 | 1.5 | 1.5 | 1.5 |
| Acrylic Resin Varnish LB7800 | 15.0 | 15.0 | 15.0 | 15.0 | 15.0 | 15.0 | 15.0 | 15.0 |
| Xylene | 13.5 | 13.5 | 13.5 | 13.5 | 13.5 | 13.5 | 13.5 | 13.5 |
| (4) Dispersion of Colored Organic Pigment | | | | | | | | |
| (D2) Hostaparm Violet BL |  |  |  |  |  |  |  | 1.5 |
| Acrylic Resin Varnish LB7800 |  |  |  |  |  |  |  | 15.0 |
| Xylene |  |  |  |  |  |  |  | 13.5 |
| TOTAL | 272.8 | 250.0 | 245.0 | 250.0 | 248.0 | 248.0 | 250.0 | 275.0 |
| Resin Solid Fraction in Paint (parts by mass) | 97.5 | 97.5 | 97.5 | 97.5 | 97.5 | 97.5 | 97.5 | 105.0 |
| Pigment Fraction in Paint (parts by mass) | 34.3 | 11.5 | 6.5 | 11.5 | 9.5 | 9.5 | 11.5 | 6.5 |
| Total Solid Fraction in Paint (parts by mass) | 131.8 | 109.0 | 104.0 | 109.0 | 107.0 | 107.0 | 109.0 | 111.5 |
| Complementary Color Relationship of (A) and (B) | Yes | Yes | No | No | Yes | Yes | — | — |
| Total (A) + (B) (parts by mass) | 34.0 | 10.0 | 5.0 | 10.0 | 8.0 | 8.0 | 5.0 | 5.0 |
| Total (A) + (B) (mass %) | 25.8 | 9.2 | 4.8 | 9.2 | 7.5 | 7.5 | 4.6 | 4.5 |

TABLE 2-continued

|  | Example of Production | | | | | | | |
|---|---|---|---|---|---|---|---|---|
|  | B-9 | B-10 | B-11 | B-12 | B-13 | B-14 | B-15 | B-16 |
| Ratio (A)/(B) | 1/1 | 1/1 | 1/0 | 1/1 | 3/1 | 1/7 | 1/0 | 1/0 |
| Ratio (C)/{(A) + (B)} (mass %) | 0.9 | 15.0 | 30.0 | 15.0 | 18.8 | 18.8 | 30.0 | 30.0 |

Moreover, the components (A) to (D) among the raw materials in Table 1 and Table 2 are described in detail below.
(A1) Colorstream T20-04WNT: Produced by the Merck Co., titanium oxide coated silica flakes, hue at a face angle: 10GY (yellow-green system color)
A2) Colorstream T20-03WNT: Produced by the Merck Co., titanium oxide coated silica flakes, hue at a face angle: 5GY (green system color)
(A3) Colorstream T20-01WNT: Produced by the Merck Co., titanium oxide coated silica flakes, hue at a face angle: 10P (red system color)
(A4) Chromashine GR20R: Produced by the Toyo Aluminum Co., interference aluminum flakes, hue at a face angle: 7.5GY (yellow-green system color)
(B1) Iriodin 223WNT: Produced by the Merck Co., metal oxide coated mica, hue at a face angle: 7.5P (violet system color), has a complementary color relationship at a face angle with Colorstream T20-04WNT, T20-03WNT and Chromashine GR20R (When, on a 100 hue ring, the interference color of Colorstream T20-04WNT is set to a hue of 0 in the Munsell color system and with respect to this hue a counterclockwise rotation is +50 and a clockwise rotation of −50, the interference color of Iriodin 223WNT is a clockwise rotation of −47.5, and when, on a 100 hue ring, the interference colors of Colorstream T20-03WNT and Chromashine GR20R are set to a hue of 0 in the Munsell color system and with respect to this hue a counterclockwise rotation is +50 and a clockwise rotation of −50, the interference color of Iriodin 223WNT is a clockwise rotation of −47.5 and a counterclockwise rotation of +50.0 respectively.
(B2) Iriodin Ultra 7235WNT: Produced by the Merck Co., metal oxide coated mica, hue at a face angle: 10GY (green system color), has a complementary color relationship at a face angle with Colorstream T20-01WNT (When, on a 100 hue ring, the interference color of Colorstream T20-01WNT is set to a hue of 0 in the Munsell color system and with respect to this hue a counterclockwise rotation is +50 and a clockwise rotation of −50, the interference color of Iriodin Ultra 7235WNT is a counterclockwise rotation of +50.0)
(B3) Xirallic T60-22WNT: Produced by the Merck Co., metal oxide coated alumina flakes, hue at a face angle: 7.5P (violet system color), has a complementary color relationship at a face angle with Colorstream T20-04WNT (When, on a 100 hue ring, the interference color of Colorstream T20-04WNT is set to a hue of 0 in the Munsell color system and with respect to this hue a counterclockwise rotation is +50 and a clockwise rotation of −50, the interference color of Xirallic T60-22WNT is a clockwise rotation of −47.5)
(B4) Iriodin 231WNT: Produced by the Merck Co., metal oxide coated mica, hue at a face angle: 7.5GY (green system color), same color system as Colorstream T20-04WNT (No complementary color relationship and when, on a 100 hue ring, the interference color of Colorstream T20-04WNT is set to a hue of 0 in the Munsell color system and with respect to this hue a counterclockwise rotation is +50 and a clockwise rotation of −50, the interference color of Iridin 231WNT is a counterclockwise rotation of +2.5)
(C1) Pigment Black FW200: Produced by the Degussa Co., carbon black pigment.
(D1) Alpaste TCR2060: Produced by the Toyo Aluminum Co., aluminum flakes, residue on heating 75 mass %.
(D2) Hostaparm Violet BL: Produced by the Clarient Japan Co., violet organic pigment, hue at a face angle: 2.5 RP (violet system color), has a complementary color relationship at a face angle with Colorstream T20-04WNT (When, on a 100 hue ring, the interference color of Colorstream T20-04WNT is set to a hue of 0 in the Munsell color system and with respect to this hue a counterclockwise rotation is +50 and a clockwise rotation of −50, the interference color of Hostaparm Violet BL is a counterclockwise rotation of +47.5)

Examples 1 to 10 and Comparative Examples 1 to 6

Production of Test Pieces with a 2C1B painting System for Evaluation Purposes

Cationic electro-deposition paint (trade name Aqua No. 4200, produced by the BASF Coatings Japan Co.) was electro-deposition coated onto a zinc phosphate treated mild steel sheet in such a way to provide a dry film thickness of 20 μm and baked at 175° C. for 25 minutes, and then a mid-coat paint (trade name Aqua GX Sealer, produced by the BASF Coatings Japan Co.) was air-spray painted in such a way as to provide a dry film thickness of 30 μm and baked at 140° C. for 30 minutes. Next the abovementioned base coat paint composition B-1 as a base coat paint was diluted with the abovementioned mixed organic solvent in such a way as to provide a spray paint viscosity of 12 to 13 seconds (20° C., Ford cup #4) and air-spray painted in such a way as to provide a dry film thickness of 15 μm and, after setting for 10 minutes at room temperature, an acrylic/melamine resin based clear paint (trade name Belcoat No. 6200 Clear, produced by the BASF coating Japan Co.) diluted with aromatic petroleum naphtha (trade name Solvesso 100, produced by the Esso Co.) to a painting viscosity (25 seconds at 20° C., Ford cup #4) was air-spray painted wet-on-wet in such a way as to provide a dry film thickness of 30 μm and baked at 140° C. for 30 minutes to produce a test piece.

The test pieces in the case of Examples 2 to 10 and Comparative Examples 1 to 6 were produced in the same way.

Example 11

Production of Test Piece with a 3C1B painting System for Evaluation Purposes

Cationic electro-deposition paint (trade name Aqua No. 4200, produced by the BASF Coatings Japan Co.) was electro-deposition coated onto a zinc phosphate treated mild steel sheet in such a way to provide a dry film thickness of 20 μm and baked at 175° C. for 25 minutes, and then a mid-coat paint (trade name Aqua GX Sealer, produced by the BASF Coatings Japan Co.) was air-spray painted in such a way as to provide a dry film thickness of 30 μm and baked at 140° C. for 30 minutes. Next a first base coat paint of a dark gray color (trade name Belcoat No. 6000 Dark Gray, produced by the BASF Coatings Japan Co.) was air-spray painted in such a way as to provide a dry film thickness of 10 μm, after setting for 10 minutes at room temperature the abovementioned base coat paint composition B-2 as a second base coat paint was air-spray painted in such a way as to provide a dry film thickness of 8 μm and, after setting for 10 minutes at room temperature, an acrylic/melamine resin based clear paint (trade name Belcoat No. 6200 Clear, produced by the BASF coating Japan Co.) diluted with aromatic petroleum naphtha (trade name Solvesso 100, produced by the Esso Co.) to a paint viscosity (25 seconds at 20° C., Ford cup #4) was air-spray painted wet-on-wet in such a way as to provide a dry film thickness of 30 μm, and baked at 140° C. for 30 minutes to produce a test piece.

Example 12

Production of Test Piece for Evaluation Purposes with a 3C1B painting System

A test piece was produced in the same way as in Example 11 except that a light gray colored first base coat paint (trade name Belcoat No. 6000 Light Gray, produced by the BASF Coating Japan Co.) was used instead.

Test Piece Evaluation Methods

The saturation (C value) of each of the paint films on the test sheets obtained was measured using a Variable Angle Spectrophotometer model GSP-2 (variable angle spectrophotometer system GCMS-4) produced by the Murakami Shikisai Gijutsu Kenkyujo K.K. while changing the angle of incidence from the light source and the light receiving angle, and the results are summarized in Tables 3 to 5.

(1) Saturation Rise Value

The value where the C value at an incident angle of 0° has been subtracted from the C value at an incident angle of 75°. This shows whether the saturation has risen on changing from a face angle to a grazing angle, and a larger value in the positive direction indicates a greater rise in the saturation from a face angle to a grazing angle and, furthermore, when the value is negative this indicates that the saturation decreases on changing from a face angle to a grazing angle.

(2) Extent of Change from an Achromatic Color to a Chromatic Color

Whether the hue changed continuously on changing the viewing angle from a face angle to a grazing angle and the range of the change in the effect of being an achromatic color at a face angle to being colored at a grazing angle from being pronounced to not being observed was evaluated visually in the steps ◉, ○, Δ and X.

◉: The color on viewing the paint film at a face angle was an achromatic color and the increase in saturation from the face angle on changing the viewing angle to a grazing angle was pronounced.

○: The color on viewing the paint film at a face angle was an achromatic color and an increase in saturation from the face angle on changing the viewing angle to a grazing angle could be clearly confirmed.

Δ: The color on viewing the paint film at a face angle was an achromatic color and an increase in saturation from the face angle on changing the viewing angle to a grazing angle could be confirmed.

X: The color on viewing the paint film at a face angle was colored, or even if it was an achromatic color an increase in saturation from the face angle on changing the viewing angle to a grazing angle could be confirmed visually.

(3) Concealing Performance

○: It could be confirmed visually that the underlying base had been completely concealed on the test piece for evaluation purposes which had been produced.

Δ: The underlying base could be seen to some extent visually on the test piece for evaluation purposes which had been produced.

(4) Finished Appearance

Whether or not the completed paint film had freshness was evaluated visually.

○: Had freshness
Δ: Inferior freshness
X: Poor gloss

TABLE 3

| | Example | | | | | |
|---|---|---|---|---|---|---|
| | 1 | 2 | 3 | 4 | 5 | 6 |
| Painting System | 2C1B | 2C1B | 2C1B | 2C1B | 2C1B | 2C1B |
| First Base | None | None | None | None | None | None |
| Base Paint | B-1 | B-2 | B-3 | B-4 | B-5 | B-6 |
| Pigments | | | | | | |
| (A1) Yellow-green | 5.0 | 5.0 | | | 0.8 | 15.0 |
| (A2) Green | | | 2.0 | | | |
| (A3) Red | | | | 5.0 | | |
| (A4) Yellow-green | | | | | | |
| (B1) Violet | 5.0 | 5.0 | 8.0 | | 0.8 | 15.0 |
| (B2) Green | | | | 5.0 | | |
| (B3) Violet | | | | | | |
| (B4) Green | | | | | | |
| (D1) (Aluminum) | | | | | | |
| (D2) Violet | | | | | | |
| (C) Carbon Black | | 1.5 | 1.2 | 1.5 | 2 | 0.2 |
| Complementary Color Relationship with (A) and (B)? | Yes | Yes | Yes | Yes | Yes | Yes |
| Amount of (A) + (B) in total paint solid fraction (mass %) | 10.0 | 9.2 | 9.2 | 9.2 | 1.6 | 23.5 |

TABLE 3-continued

|  |  | Example | | | | | |
|---|---|---|---|---|---|---|---|
|  |  | 1 | 2 | 3 | 4 | 5 | 6 |
| Ratio of (A)/(B) (mass ratio) | | 1/1 | 1/1 | 1/4 | 1/1 | 1/1 | 1/1 |
| Ratio of (C)/{(A) + (B)} (mass %) | | — | 15.0 | 12.0 | 15.0 | 125.0 | 0.7 |
| Incident Angle Received | Light Angle | | | | | | |
| 0 | −10 | 3.2 | 3.27 | 4.81 | 9.8 | 1.4 | 3.97 |
| 25 | 15 | 7.6 | 4.86 | 6.25 | 7.82 | 3.37 | 8.68 |
| 45 | 35 | 18.5 | 19.21 | 17.05 | 20.17 | 10.9 | 20.92 |
| 65 | 55 | 45.4 | 44.06 | 27.91 | 35.76 | 24.89 | 49.73 |
| 75 | 65 | 49.1 | 50.47 | 20.42 | 29.04 | 23.64 | 53.44 |
| Extent of Rise in Saturation (0°-75° saturation change) | | 45.9 | 47.2 | 15.61 | 19.24 | 22.24 | 49.47 |
| Extent of Change from An achromatic color to Colored | | ○ | ◎ | ◎ | ◎ | ○ | ◎ |
| Concealing performance | | Δ | ○ | ○ | ○ | ○ | ○ |
| Finished Appearance | | ○ | ○ | ○ | ○ | ○ | ○ |

TABLE 4

|  | Example | | | | | |
|---|---|---|---|---|---|---|
|  | 7 | 8 | 9 | 10 | 11 | 12 |
| Painting System | 2C1B | 2C1B | 2C1B | 2C1B | 3C1B | 3C1B |
| First Base | None | None | None | None | Dark Gray | Light Gray |
| Base Paint | B-7 | B-8 | B-9 | B-10 | B-2 | B-2 |
| Pigments | | | | | | |
| (A1) Yellow-green | 5.0 | 0.4 | 17.0 | | 5.0 | 5.0 |
| (A2) Green | | | | | | |
| (A3) Red | | | | | | |
| (A4) Yellow-green | | | | 5.0 | | |
| (B1) Violet | | 0.4 | 17.0 | 5.0 | 5.0 | 5.0 |
| (B2) Green | | | | | | |
| (B3) Violet | 5.0 | | | | | |
| (B4) Green | | | | | | |
| (D1) (Aluminum) | | | | | | |
| (D2) Violet | | | | | | |
| (C) Carbon Black | 1.5 | 1.0 | 0.3 | 1.5 | 1.5 | 1.5 |
| Complementary Color Relationship with (A) and (B)? | Yes | Yes | Yes | Yes | Yes | Yes |

TABLE 4-continued

|  |  | Example | | | | | |
|---|---|---|---|---|---|---|---|
|  |  | 7 | 8 | 9 | 10 | 11 | 12 |
| Amount of (A) + (B) in total paint solid fraction (mass %) | | 9.2 | 0.8 | 25.8 | 9.2 | 9.2 | 9.2 |
| Ratio of (A)/(B) (mass ratio) | | 1/1 | 1/1 | 1/1 | 1/1 | 1/1 | 1/1 |
| Ratio of (C)/{(A) + (B)} (mass %) | | 15.0 | 125.0 | 0.9 | 15.0 | 15.0 | 15.0 |
| Incident Angle Received | Light Angle | | | | | | |
| 0 | −10 | 4.5 | 0.9 | 5.1 | 6.7 | 3.6 | 1.2 |
| 25 | 15 | 6.7 | 1.2 | 9.2 | 8.9 | 7.6 | 1.5 |
| 45 | 35 | 21.3 | 1.8 | 25.3 | 15.4 | 18.5 | 13.5 |
| 65 | 55 | 48.5 | 10.5 | 54 | 20.1 | 46.7 | 22.3 |
| 75 | 65 | 53.2 | 11.6 | 58.7 | 23.5 | 52.1 | 25.9 |
| Extent of Rise in Saturation (0°-75° saturation change) | | 48.7 | 10.7 | 53.6 | 16.8 | 48.5 | 24.7 |
| Extent of Change from An achromatic color to Colored | | ◎ | ○ | ◎ | ◎ | ◎ | ◎ |
| Concealing performance | | ○ | ○ | ○ | ○ | ○ | ○ |
| Finished Appearance | | ○ | ○ | Δ | ○ | ○ | ○ |

TABLE 5

|  | Comparative Example | | | | | |
|---|---|---|---|---|---|---|
|  | 1 | 2 | 3 | 4 | 5 | 6 |
| Painting System | 2C1B | 2C1B | 2C1B | 2C1B | 2C1B | 2C1B |
| First Base | None | None | None | None | None | None |
| Base Paint | B-11 | B-12 | B-13 | B-14 | B-15 | B-16 |
| Pigments | | | | | | |
| (A1) Yellow-green | 5.0 | 5.0 | 6.0 | 1.0 | 5.0 | 5.0 |
| (A2) Green | | | | | | |
| (A3) Red | | | | | | |
| (A4) Yellow-green | | | | | | |
| (B1) Violet | | | | 2.0 | 7.0 | |
| (B2) Green | | | | | | |
| (B3) Violet | | | | | | |
| (B4) Green | | | 5.0 | | | |
| (D1) (Aluminum) | | | | | 5.0 | |
| (D2) Violet | | | | | | 1.5 |
| (C) Carbon Black | 1.5 | 1.5 | 1.5 | 1.5 | 1.5 | 1.5 |

TABLE 5-continued

|  |  | Comparative Example | | | | | |
|---|---|---|---|---|---|---|---|
|  |  | 1 | 2 | 3 | 4 | 5 | 6 |
| Complementary Color Relationship with (A) and (B)? | | — | No | Yes | Yes | — | — |
| Amount of (A) + (B) in total paint solid fraction (mass %) | | 4.8 | 9.2 | 7.5 | 7.5 | 4.8 | 4.5 |
| Ratio of (A)/(B) (mass ratio) | | 1/0 | 1/1 | 3/1 | 1/7 | 1/0 | 1/0 |
| Ratio of (C)/{(A) + (B)} (mass %) | | 30.0 | 15.0 | 18.8 | 18.8 | 30.0 | 30.0 |
| Incident Angle Received | Light Angle | | | | | | |
| 0 | −10 | 27.48 | 41.5 | 20.3 | 35.1 | 11.2 | 18.8 |
| 25 | 15 | 30.33 | 45.6 | 23.7 | 39.9 | 13.5 | 19 |
| 45 | 35 | 28.81 | 35.2 | 20.6 | 28.5 | 15.6 | 21.2 |
| 65 | 55 | 34.7 | 28.5 | 29.4 | 17.6 | 17.5 | 43.5 |
| 75 | 65 | 32.76 | 29.04 | 28.1 | 14.4 | 16.5 | 48.3 |
| Extent of Rise in Saturation (0°-75° saturation change) | | 5.28 | −12.46 | 7.8 | −20.7 | 5.3 | 29.5 |
| Extent of Change from An achromatic color to Colored | | X | X | X | X | X | X |
| Concealing performance | | ○ | ○ | ○ | ○ | ○ | ○ |
| Finished Appearance | | ○ | ○ | ○ | ○ | ○ | ○ |

Figure 2:
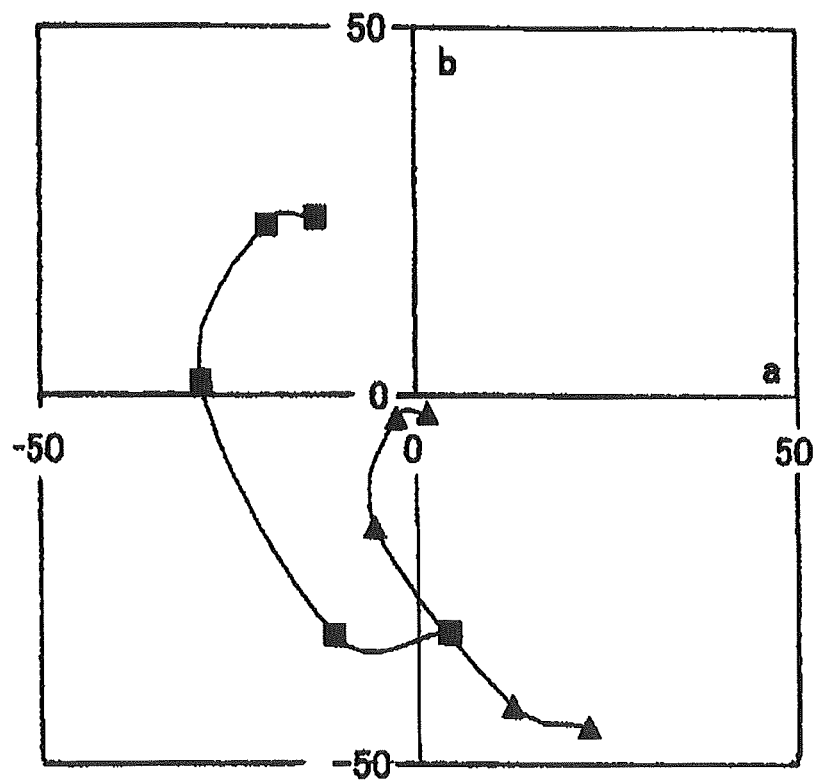
FIG. 2 is an explanatory drawing which shows the ab chromaticity diagrams of an example of the invention and a comparative example.

The ab chromaticity diagram and the measured color results for the saturation are shown in FIG. 2 and Table 6 for comparing and explaining the results of Example 2 of this invention and Comparative Example 1. In FIG. 2, ▲ denotes Example 2 and ■ denotes Comparative Example 1.

TABLE 6

| Incident Angle | Saturation in Example 2 | Saturation in Comp. Ex. 1 |
|---|---|---|
| 0 | 3.27 | 27.48 |
| 25 | 4.86 | 30.33 |
| 45 | 19.21 | 28.81 |
| 65 | 44.06 | 34.70 |
| 75 | 50.47 | 32.76 |

In FIG. 2 the saturation can be considered to be the distance from the measured value to the origin (zero point) and a smaller numerical value is an achromatic color and a larger numerical value is a brilliant color. If in the case of the examples shown in FIG. 2 the numerical values for the case where the incident angle is 0° are taken as a standard for both Example 2 and Comparative Example 1 then as the incident angle increases there is a counterclockwise movement on the ab chromaticity diagram. It is shown that in the case of Example 2 there is a change from an achromatic color to a chromatic color as the incident angle becomes larger and that in the case of Comparative Example 1 it generally has a color irrespective of the incident angle.

The invention claimed is:

1. A paint composition comprising
(A) a glitter material comprising metal oxide coated silica flakes having an angle-dependent interference effect and
(B) metal oxide coated mica and/or metal oxide coated alumina flakes
in proportions where the content ratio ((A)/(B)) of the (A) component with respect to the (B) component, as the solid fraction mass ratio, is from 2.5/1 to 1/6 and wherein the interference color of the (A) component and the interference color of the (B) component at a face angle of the paint film have a complementary color relationship, in which, on a hue ring of 100, the interference color of the (A) component is the hue 0 in the Munsell color system and with respect to this hue counterclockwise rotation is indicated by +50 and clockwise rotation is represented by −50, the interference color of the (B) component is within the range from +40 to +50, or within the range from −40 to −50, and wherein upon changing the viewing angle of a paint film obtained from the application of said paint composition from a face angle to a grazing angle the color of said paint film changes from an achromatic color having a saturation (C value) below 10 when the angle of incidence with the variable angle spectrophotometer is 75° and the change in saturation (C value) compared with the saturation (C value) at 0° of the angle of incidence is more than 10, wherein a face angle indicates a viewing angle where a light source angle of incidence is within the range from 0° to 25° and a received-light angle approximates to a mirror reflection of the angle of incidence (mirror reflection angle ±10°), and a grazing angle indicates a viewing angle where the light source angle of incidence is within the range from 65° to about 90° and the received-light angle approximates to a mirror reflection of the angle of incidence.

2. The paint composition of claim 1, where the aforementioned paint composition further comprises (C) a black colored pigment.

3. A method of paint-film formation comprising
applying to a surface a paint composition comprising
(A) a glitter material comprising metal oxide coated silica flakes having an angle-dependent interference effect and
(B) metal oxide coated mica and/or metal oxide coated alumina flakes
in proportions where the content ratio ((A)/(B)) of the (A) component with respect to the (B) component, as the solid fraction mass ratio, is from 2.5/1 to 1/6 and wherein, by setting the interference color of the (A) component and the interference color of the (B) component, in the face angle of the paint film, to a complementary color relationship, in which on a hue ring of 100, the interference color of the (A) component is the hue 0 in the Munsell color system and with respect to this hue counterclockwise rotation is indicated by +50 and clockwise rotation is represented by −50, the interference color of the (B) component is within the range +40 to +50, or within the range from −40 to −50, and forming a paint film from the applied paint composition, wherein upon changing the viewing angle of the paint film from a face angle to a grazing angle the color of said paint film changes from an achromatic color having a saturation (C value) below 10 when the angle of incidence with the variable angle spectrophotometer is 75° and the change in saturation (C value) compared with the saturation (C value) at 0° of the angle of incidence is more than 10 when the angle of incidence measured with the variable angle spectrophotometer is 75° and the change in saturation (C Value) compared with the saturation (C value) at 0° of the angle of incidence wherein a face angle indicates a viewing angle where the light source angle of incidence is within the range from 0° to 25° and the received-light angle approximates to a mirror reflection of the angle of incidence (mirror reflection angle ±10°), and a grazing angle indicates a viewing angle where the light source angle of incidence is within the range from 65° to 90° and the received-light angle approximates to a mirror reflection of the angle of incidence.

4. The method of claim 3, where the aforementioned paint composition further comprises (C) a black colored pigment.

5. A method of paint-film formation comprising
applying the paint composition of claim 1 as a base coat paint to a surface so as to form a base coat paint film and
forming a clear paint film by applying a clear paint over said base coat paint film.

6. A method of paint-film formation comprising
applying a first base coat paint to a surface to form a first base coat paint film,
applying the paint composition of claim 1 as a second base coat paint over said first base coat paint film to form a second base coat paint film, and
applying a clear paint over said second base coat paint film to form a clear paint film.

7. A paint film which has been obtained using the method of paint-film formation of claim 3.

* * * * *

UNITED STATES PATENT AND TRADEMARK OFFICE
CERTIFICATE OF CORRECTION

PATENT NO. : 9,828,516 B2  
APPLICATION NO. : 13/255776  
DATED : November 28, 2017  
INVENTOR(S) : Haruko Ryuzaki et al.

Page 1 of 1

It is certified that error appears in the above-identified patent and that said Letters Patent is hereby corrected as shown below:

On the Title Page

Item (75), Column 1, in "Inventors", Line 2, replace "Sagamihara" with "Sagamihara-shi".

Signed and Sealed this  
Tenth Day of July, 2018

Andrei Iancu  
*Director of the United States Patent and Trademark Office*